United States Patent
Lehmann et al.

(10) Patent No.: US 8,715,884 B2
(45) Date of Patent: May 6, 2014

(54) FUEL CELL AND PROCESS FOR MANUFACTURING A FUEL CELL

(75) Inventors: Mirko Lehmann, Freiburg (DE); Claas Muller, Freiburg (DE); Holger Reinecke, Emmendingen (DE); Mirko Frank, Freiburg (DE); Gilbert Erdler, Freiburg (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 12/249,699

(22) Filed: Oct. 10, 2008

(65) Prior Publication Data

US 2009/0325038 A1 Dec. 31, 2009

(30) Foreign Application Priority Data

Oct. 10, 2007 (DE) .......................... 10 2007 048 807

(51) Int. Cl.
    *H01M 8/04* (2006.01)
(52) U.S. Cl.
    USPC .......................................... 429/513; 429/515
(58) Field of Classification Search
    CPC ............................ H01M 8/065; H01M 8/1097
    USPC ........... 429/21, 30, 32, 34, 35, 36, 38, 39, 44, 429/513, 532, 535, 515
    See application file for complete search history.

(56) References Cited

U.S. PATENT DOCUMENTS

| | | | |
|---|---|---|---|
| 4,772,935 A * | 9/1988 | Lawler et al. ................. | 257/751 |
| 6,489,229 B1 * | 12/2002 | Sheridan et al. .............. | 438/614 |
| 2002/0006684 A1 * | 1/2002 | Terao et al. ................... | 438/102 |
| 2002/0106541 A1 | 8/2002 | Yamada et al. | |
| 2003/0201532 A1 * | 10/2003 | Riedl ............................ | 257/734 |
| 2003/0232252 A1 * | 12/2003 | Mancini et al. ................ | 430/5 |
| 2004/0149759 A1 * | 8/2004 | Moser et al. .................. | 220/581 |
| 2006/0088739 A1 | 4/2006 | Ovshinsky | |
| 2006/0127716 A1 * | 6/2006 | Lehmann ....................... | 429/19 |

FOREIGN PATENT DOCUMENTS

| | | |
|---|---|---|
| DE | EP 1 282 184 A2 | 5/2003 |
| DE | 10255736 A1 | 6/2004 |
| DE | 10 2004 01154 A1 | 9/2005 |
| DE | 102004011554 A1 | 9/2005 |

OTHER PUBLICATIONS

Erdler et al., Sensors and Actuators A, 132 (2006) 1331-1336.*
Erdler et al, "Chip Integrated Fuel Cell," Science Direct, Sensors and Actuators A 132, pp. 331-336 (2006).
International Search Report and Written Opinion in corresponding PCT Application No. PCT/EP2008/008532.
Erdler G et al: "Chip integrated fuel cell", Sensors and Actuators A, Elsevier Sequoia S.A., Lausanne, CH, Bd. 132, Nr. 1, Nov. 8, 2006, Seiten 331-336, XP025081953, ISSN: 0924-4247.

* cited by examiner

*Primary Examiner* — Eli Mekhlin
(74) *Attorney, Agent, or Firm* — Muncy, Geissler, Olds & Lowe, P.C.

(57) ABSTRACT

The present invention pertains to a fuel cell with a storage unit (4) for storing hydrogen ($H_x$), with a proton conductive layer, which covers a surface of the storage unit (4), and with a cathode (7) on a side of the proton conductive layer, which side is located opposite, wherein the storage unit (4) is directly coupled with an anode and/or the storage unit (4) is incorporated in a substrate (1) of a semiconductor. The storage unit (4) is preferably connected to the substrate (1) at least via a stress compensation layer (3).

19 Claims, 1 Drawing Sheet

FUEL CELL AND PROCESS FOR MANUFACTURING A FUEL CELL

PRIORITY INFORMATION

This patent application claims priority from German patent application 102007048807.8 filed Oct. 10, 2007, which is hereby incorporated by reference in its entirety.

BACKGROUND OF THE INVENTION

The present invention relates to fuel cells and methods for manufacturing fuel cells.

As technology continues to advance, autonomous microsystems will likely be increasingly used for logging of measured values at poorly accessible or mobile sites. Such a microsystem typically includes an interconnection of, for example, sensors, actuators, a signal processor and a power supply. To output processed measured values, a microsystem may further include a transmitting unit or another interface for data output. Significant advancements have been made in the miniaturization and reduction of power consumption for sensor systems and actuator systems. Similar advancements, however, have not been made for the power supplies.

Typically, intelligent microsystems include integrated circuits that use Complementary Metal Oxide Semiconductor (CMOS) technology. Such integrated circuits typically include p-channel and n-channel Metal Oxide Semiconductor Field Effect Transistors (MOSFETs). By incorporating CMOS technology, however, materials and processes used for the intelligent microsystem must be CMOS-compatible, which is particularly relevant to CMOS processes that are monolithically performed on silicon chips. Furthermore, storage media should have a high energy density, components should be compatible with the environment, and the power supply should be able to be miniaturized and be cost effective.

The power supply for such autonomous microsystems can include batteries, storage batteries and micro fuel cells. Fuel cell systems have already become established as macroscopic energy systems. However, manufacturing fittings and guides having sufficient tolerances for mechanical components such as valves and pressure regulators, which include movable parts, has become increasingly more complicated due to needs for miniaturization. Attempts made so far at miniaturizing fuel cells are, therefore, limited to the fuel cell proper. Prior art methods include several approaches towards manufacturing PEM (Proton Exchange Membrane) fuel cells according to the silicon technology. Separate hydrogen storage units are made available, especially used, for power supply. In addition, direct methanol fuel cells are known, which are designed as passive systems, the oxidant methanol being supplied from a storage tank via capillary forces to the anode of the fuel cell. The $CO_2$ gas bubbles formed during the reaction of the methanol are likewise removed using capillary forces.

SUMMARY OF THE INVENTION

The object of the present invention is to provide an alternative fuel cell or a process for manufacturing such a fuel cell, wherein miniaturization, including a hydrogen storage unit, is made possible. In particular, a monolithic reaction will be made possible in conjunction with the CMOS technology.

According to one embodiment of the present invention, a fuel cell or a monolithic arrangement according to a CMOS technology is provided that includes a storage unit for storing hydrogen, a proton conductive layer and a cathode. The proton conductive layer covers a surface of said storage unit. The cathode is disposed on a side of said proton conductive layer, which said side is located opposite said storage unit. The storage unit is directly coupled with an anode, said storage unit itself forms an anode and/or said storage unit is included in or on a substrate of a semiconductor.

In one embodiment, the storage unit is connected to the substrate at least via a stress compensation layer. The stress compensation layer is advantageously made of a ductile material such as, but not limited to, tin, gold, silver, lead, cadmium or indium. Tin is especially preferred because of its environmental compatibility.

In another embodiment, the stress compensation layer is formed in all areas in a direct vicinity of the substrate and of the storage unit for the hydrogen. In other words, the stress compensation layer is formed around the storage unit on all sides towards which the substrate is arranged adjacent to the storage unit directly or via additional inserted layers. Where the fuel cell has a trough structure, in which the storage unit is accommodated, the stress compensation layer can correspondingly extend over the wall areas within the trough between the storage unit and the substrate.

In another embodiment, a diffusion barrier is formed between the storage unit and the substrate such that a reduced quantity of or preferably no hydrogen can escape from the storage unit towards the substrate. The diffusion barrier may be formed from silicon nitride and/or silica and/or an oxynitride layer.

In another embodiment, the diffusion barrier is formed in all areas in a direct vicinity of the substrate and of the storage unit for receiving the hydrogen and optionally other layers. Correspondingly, the storage unit may additionally be surrounded by a diffusion barrier, which inhibits or prevents the passage of hydrogen from the storage unit to the substrate.

In another embodiment, the storage unit is completely surrounded, in a part of its circumferential area, by a proton conductive, non-hydrogen conducting layer, and in the other areas of its circumference by a diffusion barrier for hydrogen. Such an arrangement ensures that hydrogen cannot diffuse over time from the hydrogen storage unit.

In another embodiment, the storage unit is in contact with one side of the proton conductive layer and in which a self-breathing air diffusion layer is formed as the cathode on the side that is opposite thereto, wherein the self-breathing air diffusion layer is sufficiently porous for the passage of air, especially for the passage of oxygen.

In another embodiment, the storage unit, which is capable of receiving hydrogen, is embedded in a cavity or pit within a substrate, preferably one comprising silicon, wherein a stress compensation layer and/or a diffusion barrier for hydrogen is formed between a surface of the storage unit and a surface of the substrate, which said surfaces are adjacent to each other.

According to another embodiment of the invention, a method is provided for manufacturing a fuel cell. The method includes: forming a cavity or pit in a substrate comprising silicon; forming a stress compensation layer comprising a ductile material, and a diffusion barrier for inhibiting or blocking the passage of hydrogen in said cavity; filling the remaining cavity with a storage unit comprising palladium; covering said diffusion barrier, said stress compensation layer and said storage unit with a proton conductive, non-hydrogen conducting layer on a remaining free surface; and forming a cathode on an opposite side of said proton conductive layer such that said cathode allows air and/or oxygen to pass through.

Such a fuel cell can be manufactured in a surprisingly simple manner and offers a large number of advantages. For example, the mass of the hydrogen being fed to the fuel cell can be controlled by varying the material properties of the surface of the hydrogen storage unit as well as by varying the contact surface between the hydrogen storage unit and the fuel cell. The hydrogen preferably reaches the membrane electrode unit (MEA) from the hydrogen storage unit directly by diffusion. The fuel cell may be configured as a self-breathing system, i.e., the use of atmospheric oxygen from the immediate environment, making it possible to build up the fuel cell system completely without active components such as guiding systems and valves.

The afore-described fuel cell, which includes the hydrogen storage unit, is especially well suited for miniaturization based due to its simple design. If the fuel cell is constructed from CMOS-compatible materials, the fuel cell including the storage unit for the hydrogen can be monolithically integrated at the chip level.

The advantage of such a fuel cell design over other electrical energy sources, for example, storage batteries, is that the capacity and the output can be set separately from one another. The capacity of the fuel cell is set by setting the layer thickness of the integrated hydrogen storage unit because of the fixed surface area and the fixed volume. The output is obtained from the contact surface between the integrated hydrogen storage unit and the polymer electrolyte membrane.

BRIEF DESCRIPTION OF THE DRAWINGS

An exemplary embodiment will be explained in more detail below on the basis of the drawings. In the drawings, FIG. 1 schematically shows a side view of a cut-away fuel cell and reaction formulas for illustrating the process in some of the fuel cell areas.

DETAILED DESCRIPTION OF THE INVENTION

Figure 1:
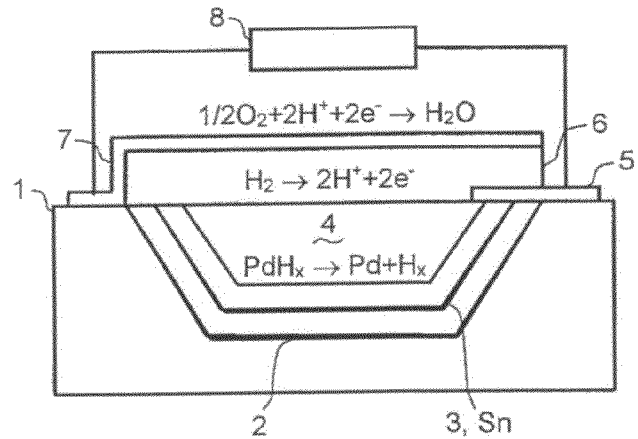
Figure 2:
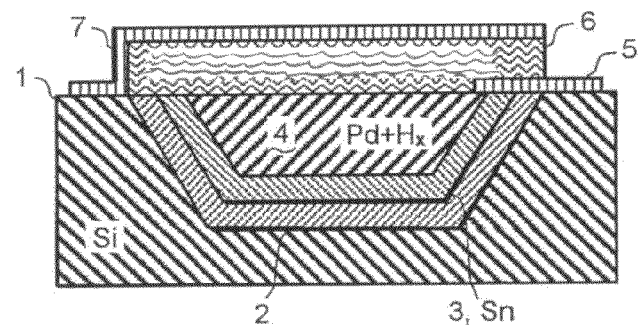
FIG. 2 shows the fuel cell according to FIG. 1 in a sectional view.

FIGS. 1 and 2 schematically illustrate a section of a semiconductor arrangement that includes an integrated fuel cell. Improved miniaturization is achieved by directly integrating the fuel cell on or in a silicon chip. Components, which were separated in prior art fuel cells, are now combined in new functional units. In particular, a hydrogen storage unit is integrated directly in the fuel cell structure. The hydrogen storage unit is coupled directly with an anode of the fuel cell.

A pit, which is filled with various layers and materials, is formed in a substrate 1 made of silicon. A diffusion barrier 2, which can reduce or prevent the passage of hydrogen, is located directly adjacent to the substrate 1. A stress compensation layer 3, which comprises, e.g., tin, is located adjacent the diffusion barrier 2 on a side opposite of the substrate 1. A storage unit 4 adapted as a hydrogen storage unit, which at the same time forms an anode, is located adjacent the stress compensation layer 3 on a side opposite of the diffusion barrier 2. In a preferred embodiment, the storage unit 4 comprises palladium.

In the embodiment in FIGS. 1 and 2, the diffusion barrier 2 and the stress compensation layer 3 are arranged in a trough-shaped configuration in the pit, where each has upper, outside edges that are flush with a surface of the substrate 1. The storage unit 4 also has a surface, which preferably is flush with the surface of the substrate 1, diffusion barrier 2 and stress compensation layer 3. As a result, the storage unit 4 is completely surrounded, with respect to the substrate 1, by first the stress compensation layer 3 and then by the diffusion barrier 2.

The storage unit 4 undergoes an expansion or contraction by up to about 12% when it is respectively loaded or unloaded with hydrogen. Materials and dimensions of the stress compensation layer 3 are selected such that the expansion and the contraction of the storage unit 4 is compensated to prevent separation of the arrangement from the substrate 1 and/or cracking in the substrate 1. Preliminary experiments have shown that, for example, a stress compensation layer 3 with a layer thickness of 70 .mu.m is suitable at a layer thickness of 130 .mu.m for the storage unit 4.

An anode contact 5 is located above the substrate 1, the diffusion barrier 2, the stress compensation layer 3 and the storage unit 4. The anode contact extends from a top-side edge area of the storage unit 4 via the top-side edge sections of the stress compensation layer 3 and the diffusion barrier 2 to the surface of the substrate 1 for electrically contacting the anode formed by the storage unit 4. In addition, the surface of the entire arrangement, which comprises the storage unit 4 and the top-side or outside edge sections of the stress compensation layer 3 and of the diffusion barrier 2, is covered with a membrane 6. The membrane 6 is designed as a polymer electrolyte membrane or proton conductive layer. The membrane 6 is preferably covered completely by a cathode 7 functioning as a second electrical connection contact on the side of the membrane 6 that is located opposite the arrangement and is hence the outer side. The cathode 7 preferably extends, on at least one circumferential edge section, laterally from the membrane 6, up to the substrate 1, and extends in parallel over the surface of the substrate 1 in order to form a connection contact point. An electrical user 8, therefore, can be connected to the cathode 7 and to the anode contact 5 in order to be supplied with electric power.

In a preferred embodiment, the storage unit 4 is adapted as a hydrogen storage unit comprising palladium Pd, which is partially filled with hydrogen. When an electric load, such as the user 8, is connected, $PdH_x$ is correspondingly reacted into $Pd+H_x$ in the storage unit 4. Transition of hydrogen to protons and electrons takes place in the membrane 6. Water, $H_2O$, is formed by the reaction $\frac{1}{2}O_2+2H^++2e^-$ by the stored hydrogen reacting with atmospheric oxygen, which is fed in on the outside via the cathode 7.

In some embodiments, the storage unit 4 is applied directly to the silicon-based substrate 1 and is rigidly connected thereto. The hydrogen storage unit 4 can thus be directly integrated on a chip. To ensure long-term stability of hydrogen storage in the palladium of the storage unit 4, all the surfaces that have no contact with the fuel cell, i.e., the membrane 6, are shielded with the diffusion barrier 2 over the environment in order to suppress or prevent the diffusion of hydrogen.

To prevent hydrogen from escaping in the area of the top side, the membrane 6 covers the entire surface of both the storage unit 4 and of other adjoining components or layers in the surface area up to the diffusion barrier 2. The membrane 6 is preferably hydrogen gas-tight and is coupled with the storage unit 4 over the full surface area.

Such a diffusion barrier 2, which will be used as a hydrogen diffusion barrier layer, can be preferably deposited using silicon nitrite layers or oxynitride layers via Chemical Vapor Deposition (CVD). During experimentation, a silicon substrate 1 was adhered by a combination of polysilicon and palladium with subsequent formation of palladium silicide.

The stress compensation layer 3 is placed between the diffusion barrier 2 and the storage unit 4 in the embodiment shown in FIGS. 1 and 2 to compensate or at least sufficiently reduce stresses that develop because of an enlargement of the volume of the storage unit 4 during loading with hydrogen. CMOS-compatible solutions are hereby made possible in manufacture. The mechanical stresses developing at the interface to the silicon substrate 1 during the loading or unloading of the integrated storage unit 4 with hydrogen are compensated by a tin layer preferably deposited by electroplating, which forms the stress compensation layer 3.

In an alternative embodiment, the stress compensation layer 3 and the diffusion barrier 2 may be formed and arranged in the reverse order between the substrate 1 and the storage unit 4. In other words, the stress compensation layer 3 may be disposed between the substrate 1 and the diffusion barrier 2.

During operation of the disclosed fuel cell, the hydrogen being stored in the palladium of the storage unit 4 diffuses in the atomic form to the boundary surface between the coupled membrane 6 and the storage unit 4 after the connection of a load such as the user 8. Based on the catalytic action of palladium, the hydrogen dissociates into a proton and an electron. The protons migrate through the polymer electrolyte membrane, whereas the electrons reach the cathode 7 of the fuel cell via the user 8 to be operated. The protons react at the cathode 7 with the electrons and the atmospheric oxygen from the environment to form water.

The stress compensation layer 3 should have lowest relatively low modulus of elasticity possible in order to reduce the mechanical stresses towards the substrate 1. To compensate the mechanical stresses of the palladium storage unit, a material that is as ductile and as reversibly deformable as possible is selected for the stress compensation layer 3. In addition, the material of the stress compensation layer 3 should have a good adhesive strength both to the palladium storage unit 4 and to the silicon substrate 1 or to the thin layers, which are applied to the substrate 1 and which are usually inserted. In addition, materials are preferably used that can be deposited according to typical methods employed in semiconductor technology or compatible methods, or can be manufactured, in case of greater layer thicknesses, using thick-layer processes, for example, electroplating, screen printing or casting processes. In addition, the materials used to form the stress compensation layer 3 will preferably be environmentally compatible. Such ductile materials include gold, silver, lead, cadmium, indium or tin. Tin is especially preferred in terms of environmental compatibility and cost-effectiveness for manufacture. Therefore, a fuel cell system may advantageously be formed from silicon, palladium, a polymer electrolyte membrane with palladium current collector and tin. These selected materials advantageously are materials that typically do not harm the environment.

Figure 3A:
FIGS. 3A-E shows process steps for manufacturing such a fuel cell.

FIGS. 3A-E shows a sequence of steps for the manufacture of the fuel cell in FIGS. 1 and 2. Referring to FIG. 3A, a pit 11 is formed in the substrate 1, which may be carried out, for example, by wet chemical etching with KOH⁻ or dry etching. Typical manufacturing steps for forming the pit 11 include masking the silicon surface, opening the masking in a desired area in which the storage unit 4 will be formed, preparing the cavity of the pit 11, and removing the masking layers.

Figure 3B:
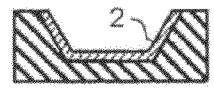

Referring to FIG. 3B, The diffusion barrier 2 (i.e., the barrier for hydrogen) is formed at the walls of the pit 11. For example, this may be carried out by preparing an oxide layer from SiO and the subsequent preparation of the nitride layer proper by CVD to form $Si_3N_4$.

Figure 3C:
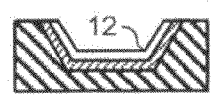

Referring to FIG. 3C, a bonding agent layer and an electroplating starting layer are deposited. The bonding agent layer preferably includes polysilicon prepared by CVD. The electroplating starting layer preferably includes palladium applied by Physical Vapor Deposition (PVD). The Pd silicide formation proper takes place by tempering. Polysilicon is used according to typical CMOS processes as an adhesive layer for palladium. Palladium is formed at the boundary to the palladium silicide, because polysilicon is preset thereunder. The polysilicon thus forms a bonding agent layer 12. This is used primarily for contacting, and, above all, reinforcement with aluminum is possible as well.

Figure 3D:

Referring to FIG. 3D, the stress compensation layer 3 proper is formed in the pit 11 on the layer structure located therein. After masking the silicon surface of the substrate 1 using typical lithographic processes, the stress compensation layer 3 proper, which includes Tin Sn, is applied using an electroplating process.

Figure 3E:
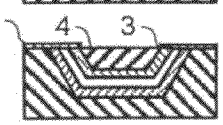

Referring to FIG. 3E, the storage unit 4 proper, which includes palladium Pd, is formed using a typical Pd electroplating process in the remaining pit 11 after the preparation of the stress compensation layer 3. Planarization of the surface is performed using, for example, a polishing machine in order to obtain a uniform surface over the substrate 1, storage unit 4 and edges of the stress compensation layer 3, which reach the surface between these, and the diffusion barrier 2. The storage unit 4 can further be contacted by, for example, a corresponding masking of the surface using a lithographic process, the preparation of a gold layer to form the contacts using, e.g., PVD by vapor deposition and structuring of gold strip conductors from the gold layer 9.

After the palladium has been filled into the pit 11 as an anode or storage unit 4 and before the membrane 6 is applied, the storage unit 4 is filled with hydrogen. The hydrogen diffuses into the palladium. The proton conductive membrane 6 is subsequently applied as a cover, which does not let hydrogen through, on the one hand, but does let protons through, on the other hand. The structuring may also be carried out using typical process steps from CMOS processes such as, for example, the use of a Reactive Ion Etching (RIE). Advantageously, auxiliary layers may be used to protect the silicon substrate. Adhesion of the polymer electrolyte membrane to the palladium storage unit is preferably achieved using a bonding substance, which is added to the polymer dispersion. Atomic hydrogen is thus advantageously already present in the palladium of the storage unit 4 or of the anode before coverage with the membrane 6.

The polymer electrolyte membrane is subsequently formed as the membrane and the cathode 7 is formed on the surface of the substrate 1 or of the materials introduced into the pit 11. To design a semiconductor technological embodiment of a self-breathing air diffusion layer, a current collector for electrical return to the substrate 1 and a fine, catalytically active palladium lamellar structure is preferably constructed on the membrane 6. The palladium lamellar structure at the same time forms the self-breathing air diffusion layer and the cathode 7 of the fuel cell. Microstructured sputtering masks, which are prepared using deep etching process known as advanced silicon etching from, for example, silica wafers having a thickness of 300 .mu.m, may be used to structure the palladium current collector and the palladium air diffusion electrode. The web width of the lamellar structure formed was 100 .mu.m in preliminary experiments. Such a microstructured palladium catalyst is highly porous and hence permeable to air. A CVD silicon nitride layer was used as a suitable electrical insulation layer between the anode and cathode according to preliminary experiments.

The invention claimed is:
1. A fuel cell, comprising:
a semiconductor substrate;

a recess formed by a recess base surface and a recess sidewall surface in a top surface of said semiconductor substrate said recess forming a storage unit functioning as an anode and containing palladium and hydrogen;

a stress compensation layer covering the recess base surface and the recess side wall surface, the stress compensation layer formed of a ductile material to compensate for mechanical stress on the semiconductor substrate during loading and unloading of hydrogen in the storage unit;

a proton conductive layer that is deposited on the top surface and covers the recess to form a chamber comprising the palladium and hydrogen; and a cathode on an exterior side of the proton conductive layer.

2. The fuel cell of claim 1, further comprising a diffusion barrier layer disposed between the stress compensation layer and the semiconductive substrate.

3. The fuel cell of claim 2, where said diffusion barrier is formed from at least one of silicon nitride, silica and an oxynitride layer.

4. The fuel cell of claim 1, where the ductile material comprises tin, gold, silver, lead, cadmium or indium.

5. The fuel cell according to claim 1, wherein the cathode completely covers an upper surface of the proton conductive layer.

6. The fuel cell according to claim 1, wherein the cathode extends from an upper surface of the proton conductive layer to the top surface of the substrate.

7. The fuel cell according to claim 1, wherein the cathode extends over a portion of the top surface of the substrate to form a connection contact point.

8. The fuel cell according to claim 1, wherein the cathode completely covers the proton conductive layer.

9. The fuel cell according to claim 1, wherein the storage unit and the stress compensation layer each have a surface that ends flat with a surface of the substrate.

10. The fuel cell according to claim 9, wherein the proton conductive layer covers the surface of the storage unit and the stress compensation layer.

11. The fuel cell according to claim 1, further comprising an anode contact that extends along a top surface of the semiconductor substrate from a top edge of the anode and the stress compensation layer towards a side of the semiconductor substrate and past the chamber.

12. The fuel cell according to claim 1, further comprising an anode contact extending from a top side edge of the storage unit via a top side edge of the stress compensation layer to a surface of the semiconductor substrate.

13. A process for manufacturing a fuel cell, comprising:
    forming a recess in a top surface of a substrate comprising silicon where the recess is bounded by a recess base surface and a recess sidewall surface;
    covering the recess base surface and the recess sidewall surface with a diffusion barrier layer;
    providing palladium containing hydrogen in the recess whereby said recess provides a storage unit functioning as an anode;
    forming a stress compensation layer that covers the diffusion barrier layer, the stress compensation layer on the recess base surface and recess sidewall surface being formed of a ductile material to compensate for mechanical stress on the substrate during loading and unloading of hydrogen in the storage unit;
    providing a proton conductive layer on the top surface that covers the storage unit to form a chamber that comprises the palladium and hydrogen;
    forming a cathode on an exterior surface of the proton conductive layer, where the cathode is oxygen permeable; and
    providing an anode contact that extends along a top surface of the semiconductor substrate from a top edge of the recess sidewall surface and the stress compensation layer towards a side of the semiconductor substrate and past the chamber.

14. The process according to claim 13, wherein the cathode extends from an upper surface of the proton conductive layer to the top surface of the substrate.

15. A fuel cell, comprising:
    a semiconductor substrate that includes a top surface having a recess therein formed by a recess base surface and a recess sidewall surface, said recess containing palladium and hydrogen;
    a stress compensation layer covering the recess base surface and the recess side wall surface, the stress compensation layer being formed of a ductile material to compensate for mechanical stress on the semiconductor substrate during loading and unloading of hydrogen in the recess;
    a proton conductive layer that is deposited on the top surface and covers the recess to form a chamber that comprises the palladium and hydrogen; and
    an anode contact that extends along a top surface of the semiconductor substrate from a top edge of the recess sidewall surface and the stress compensation layer towards a side of the semiconductor substrate and past the chamber.

16. The fuel cell of claim 15, further comprising a diffusion barrier layer underlying the palladium and the hydrogen and disposed between the stress compensation layer and the semiconductive substrate.

17. The fuel cell according to claim 15, further comprising a cathode that extends from an upper surface of the proton conductive layer to the top surface of the substrate.

18. A fuel cell, comprising:
    a storage unit for storing hydrogen;
    a proton conductive layer that covers a surface of the storage unit;
    a cathode arranged on a side of the proton conductive layer, which said side is located opposite the storage unit;
    an anode, the storage unit being directly coupled with the anode, wherein the storage unit is incorporated in or on a substrate of a semiconductor, the storage unit being embedded in a recess within a substrate formed of silicon the recess having a base surface and sidewall surfaces;
    a stress compensation layer formed on recess base and sidewall surfaces and between adjacent surfaces of the storage unit and the substrate, the stress compensation layer being formed of a ductile material to compensate for mechanical stress on the semiconductor substrate during loading and unloading of hydrogen in the storage unit; and
    an anode contact extending along a top surface of the substrate from a top edge of the anode and the stress compensation layer towards a side of the substrate and past the proton conductive layer.

19. The fuel cell according to claim 18, wherein the cathode extends from an upper surface of the proton conductive layer to a top surface of the substrate.

* * * * *